Feb. 13, 1940. J. S. GOODMAN Re. 21,347

PRUNING APPARATUS FOR TREES AND THE LIKE

Original Filed Sept. 10, 1934

John S. Goodman
INVENTOR

BY Cecil L. Wood
ATTORNEY

Reissued Feb. 13, 1940

Re. 21,347

UNITED STATES PATENT OFFICE 21,347

PRUNING APPARATUS FOR TREES AND THE LIKE

John S. Goodman, near Wichita Falls, Tex.

Original No. 2,075,341, dated March 30, 1937, Serial No. 743,400, September 10, 1934. Application for reissue March 28, 1939, Serial No. 264,664

8 Claims. (Cl. 30—228)

This invention relates to apparatus for pruning and trimming trees, shrubbery, and the like, and it has particular reference to a device of such a character capable of being driven or operated by air pressure to eliminate the necessity of manual operation, and it has for its principal object the provision of a structure comprised of such mechanical elements as will permit of its operation to clip or cut off superfluous limbs and twigs from fruit trees or shade trees, as well as smaller shrubbery.

A further object of the invention resides in the provision of an apparatus capable of eliminating much of the manual effort required to properly trim and prune trees, shrubbery and the like, yet without injuring or breaking the same which often results in irreparable damage to the plants and which is especially true of fruit trees, grape vines, berry plants, and other varieties of trees and shrubbery, it being commonly necessary to utilize a saw or an axe to sever the heavier or thicker branches.

Still another object of the invention is in the provision of the apparatus which is portable in its nature and can be mounted upon a truck or trailer for transportation to a point where it can be placed in operation and can also be arranged upon a small cart, or the like, whereby it can be propelled manually. The invention is designed to operate in conjunction with a conventional type of air compressor and pressure tank, which assembly, as previously stated, is capable of easy transportation from place to place.

While the foregoing objects are paramount, other and lesser objects will become manifest as the description proceeds, taken in connection with the appended drawing wherein.

The commonly known methods of trimming or pruning fruit trees, shade trees and shrubbery is by the use of shears, or the like, which are manually operated and considerable effort is necessary in the use of these ordinary instruments since it is necessary in some instances to do a great deal of climbing into branches to reach the limbs or twigs which it is necessary to sever from the tree. Moreover, the ordinary shears will not sever the limbs of larger diameter, and hence it is necessary to use a saw in order that a clean-cut operation will result to prevent the tree from "bleeding." When a saw is used it is obvious that the operator must be in close proximity to the branch upon which work is being done, and the invention is so constructed as to afford a device whereby the operator can stand on the ground and reach various parts of the tree to prune its branches.

Figure 1:
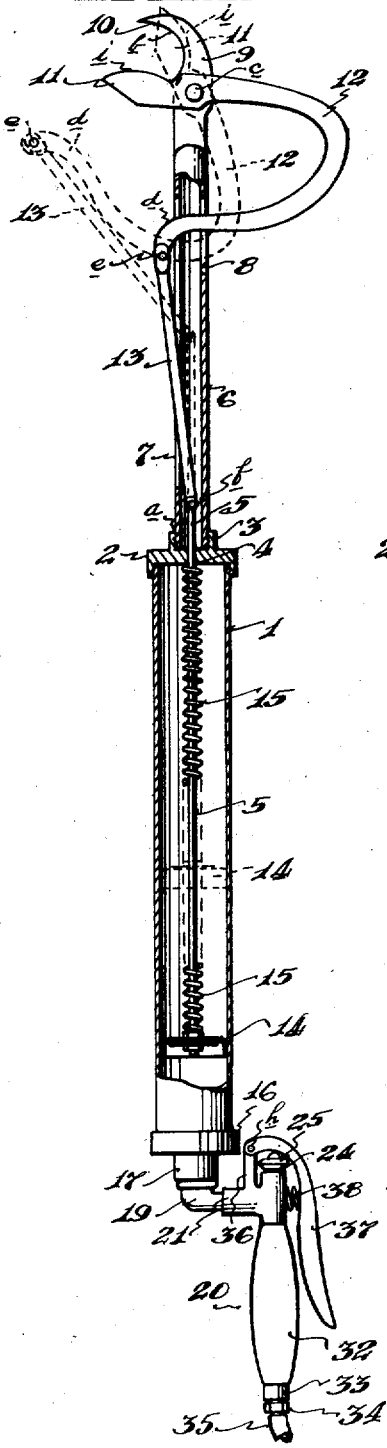
Figure 1 is a side elevational view of the invention showing portions cut away to illustrate the movement of the mechanism within the cylinder and housing and illustrating in dotted lines the closed position of the blades.
Figure 2:
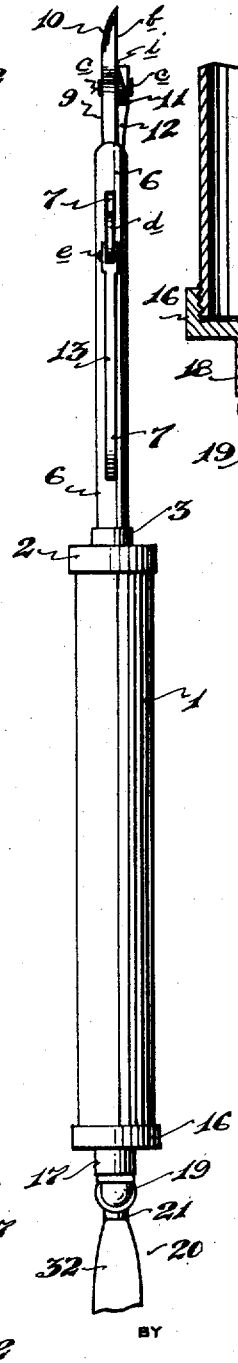
Figure 2 is a front elevation view of the invention.

Accordingly, therefore, the invention comprises primarily a cylinder 1, upon the upper end of which is threaded a member 2 having a boss 3 which is provided with a passage or aperture 4 which forms a bearing for a piston rod 5, as illustrated in Figure 1.

The boss 3 is interiorly threaded at *a* to receive a tubular housing 6 having a slot 7 in one side thereof and extending the greater part of its length, the function of which will be presently described. A slot 8 of lesser length than the slot 7 is provided in the opposite side of the housing 6, the entire arrangement being completely illustrated in Figure 1.

At the uppermost end of the housing 6, a blade 9 is rigidly attached, as by welding, riveting, or the like, which has its inner end extending substantially longitudinally of the said housing 6. The blade 9, however, is curved near its outermost end and terminates in a point, its arcuate turn defining a substantial hook 10 whose innermost periphery is ground to a knife-like edge *b*.

Pivoted at *c* approximately midway the length of the blade 9 is another blade or knife 11 having a peculiarly curved integral arm 12 which is substantially U-shaped in elevation and is curved downwardly at its opposite end at *d*, at which point the arm 12 extends through both of the slots 7 and 8 in the housing 6, previously described.

A short distance below the curved portion of the arm 12 and pivoted to its lowermost end at *e* is a link 13 which is normally in a substantially vertical position and extends downwardly through the slot 7 in the housing 6 to the uppermost end of the piston rod 5 and is pivoted thereto at *f*. At the lowermost end of the piston rod 5 is attached a cup piston 14 preferably of leather or the like. A coil compression spring 15 is provided to surround the piston rod 5 and bear against the upper side of the cup 14 and the lowermost side of the member 2 threaded upon the upper end of the cylinder 1.

Figure 3:
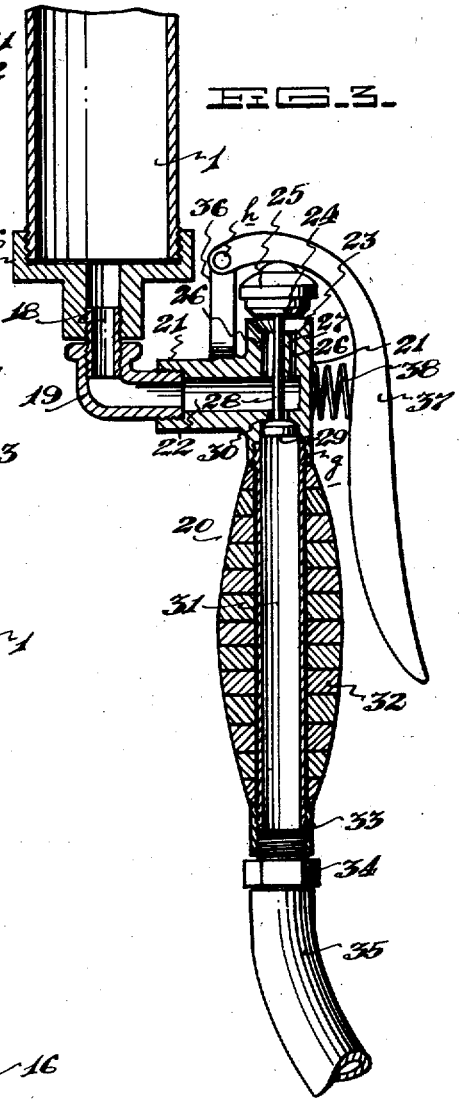
Figure 3 is an enlarged vertical sectional view of the valve assembly showing, in detail, the manner in which the device is operated.

A member 16, similar to the member 2, is threaded upon the lowermost end of the cylinder 1, illustrated in detail in Figure 3, having a boss 17 through which is threaded a nipple 18 having, preferably, an L 19 threaded thereupon which connects its opposite end to the valve assembly 20.

Describing the valve assembly 20 in detail, it is pointed out that a head member 21 is provided which is substantially T-shaped, as shown in Figures 1 and 3, and has a horizontal passage 22 thereinto. At the uppermost end of the head member 21 a beveled ground seat 23 is provided to receive the closure valve 24, preferably of rubber, or the like, which is retained by an annular cap 25.

A series of small ports or passages 26 are provided, which extend downwardly from the beveled seat 23 through the head member 21 and communicate with the horizontal passage 22. A passage 27 is provided through the center of the head member 21 extending downwardly therethrough to afford a guide or bearing for a valve stem 28, having a valve 29 rigidly attached to its lowermost end and adapted to seat itself normally against a beveled ground seat 30. It is pointed out that this valve member 29 seats upwardly with respect to the head member 21, while the valve member 24 seats downwardly.

A nipple 31 is threaded, at its uppermost end, into the lowermost portion of the head member 21 at *g*, and a handle grip 32 is arranged upon the nipple 31, preferably of laminated material such as leather, or the like. A sleeve 33 is threaded upon the lowermost end of the nipple 31 to secure the handle grip 32 in position thereon as illustrated in Figure 3. A hose connection 34 is also threaded into the sleeve 33 to receive a length of flexible tubing 35, preferably rubber hose, or the like.

Extending upwardly from the lateral portion of the head member 21 and integral therewith, a standard 36 is provided, to which an operating lever 37 is pivoted. The lever 37 is substantially of conventional design, being curved to conform to the hand at its larger portion which extends downwardly and substantially parallel with the handle grip 32, while its uppermost end defines a curve or "gooseneck" the end of which is pivoted at *h* to the standard 36, as previously described. A coil spring 38 rests against one side of the head member 21 and extends into and against the operating lever 37 to retain the latter in its normal position.

In operation, the flexible tubing or hose 35 is attached, at its opposite end, to a pressure tank (not shown) which is supplied by a conventional air compressor (not shown) and when the pressure is allowed to pass through the tubing 35 and the nipple 31 into the valve assembly 20, the valve 29 is held against its seat 30 in the manner shown in Figure 3. This is the normal position of the valve 29. Obviously, when the valve 29 is urged against its seat 30, the stem 28, upon which the valve 24 is also secured, is urged upwardly, lifting the valve 24, thus opening the passages 26 which communicate with the lateral or horizontal passage 22 in the head member 21, exhausting any air pressure which may be retained in the latter or the cylinder 1.

In order to operate the blades or knives 9 and 11, it is only necessary to grasp the handle grip 32 in the hand and press the lever 37 inward against the tension of the spring 38 to depress the valve 24 against its seat 23, closing the passages 26 which communicate with the lateral or horizontal passage 22. This operation will also open the valve 29 by urging the latter downward by reason of its stem 28 being connected to the valve 24, thus admitting air pressure from the source to enter the passage 22, thence upwardly to the L 19 and member 16 into the cylinder 1 where such pressure will urge the cup piston 14 upwardly, as shown in dotted lines in Figure 1, compressing the spring 15 surounding the piston rod 5 and actuating the link 13, as the piston rod is urged upwardly into the housing 6 to operate the arm 12 upon its pivot at *c* to close the blades 9 and 11 and positioning the latter in the manner illustrated in dotted lines in Figure 1.

The action of the piston rod 5 is rapid by reason of the sudden ingress of air pressure into the cylinder 1 beneath the piston 14, which quickly urges the latter upwardly to its uppermost position and thus the rapid contact of the blades 9 and 11 renders them capable of quickly severing the article placed between them. The blade 11 is ground to a knife-like edge at *i*, which corresponds to the cutting edge *b* of the blade 9. The operation, therefore, of the blades 9 and 11 is substantially the same as manually operated shears, or scissors, and affords a highly desirable means whereby limbs or branches can be severed from trees or shrubbery.

To effect the opening of the blades 9 and 11, that is to say, return the blade 11 to its normal position, the lever 37 must be released to permit the closure valve 24 to rise from its seat 23 to permit the valve 29 to seat itself upon its ground seat 30. It will be seen that, by this operation, the pressure that remains in the cylinder 1 and retains the piston 14 in its uppermost position, shown in dotted lines in Figure 1, will be released through the series of passages 26 past the closure 24 and allow the piston 14 to assume its normal position, thereby also normally positioning the blade 11 as exemplified in Figure 1. The only function, therefore, of the closure 24 and the seat 23, as well as the passages 26, is to permit the exhaust of air from the cylinder 1 to allow the mechanism to assume its normal position where it can be actuated again when the lever 37 is depressed, as previously described.

It is pointed out that by reason of the slots 7 and 8, which are cut in both sides of the housing 6, the invention operates with accuracy and speed and is far more efficient than the ordinary manual methods of accomplishing the results for which the device is designed. Its structure affords a tool which will tend to eliminate much manual effort and enable one person to accomplish much more work than can be accomplished by several persons utilizing the commonly known methods.

When the blade 11 is in its closed position (shown in dotted lines), the relative positions of the link 13 and the curved arm 12 are such as to create a power multiplying action to exert the greatest fluid pressure on the knife.

Palpably, the invention can be used also as a hedge trimmer by lengthening the blades 9 and 11 to the necessary proportions to meet properly the requirements of such an instrument.

Attention is directed to the drawing wherein it is shown to be obvious that the housing 6 can be extended to varying lengths by providing a coupling for the housing 6 and the piston rod 5 so that the operator can remain on the ground and reach various parts of a tree with little effort. It is not intended to limit the structure to any specific length or dimension, nor is it intended to limit its usefulness by herein stating that it is primarily designed for use as a tree pruner or trimmer. Obviously such a tool can be utilized for cutting wire or other similar materials.

Although the invention has been described with great particularity, certain changes and modifications may be resorted to from time to time by those skilled in the art and such changes and modifications as may be considered within the spirit and intent of the invention may also be considered as falling within the scope of the appended claims.

What I claim is:

1. A pruning device comprising a cylinder having a piston operatively disposed therein, the said piston being attached to the lowermost end of a piston rod, a spring surrounding the said piston rod and urging the piston to its normal position in the lower portion of the said cylinder, a tubular housing rigidly attached to the top portion of the said cylinder and having an integral blade attached to its uppermost end, a movable blade cooperating with the said first named blade and having an operative lever portion, a link connecting the lever portion of the said movable blade to the uppermost end of the said piston rod and operating through lateral slots in the said tubular housing, a valve attached to the lowermost end of the said cylinder and capable of admitting a fluid into the said cylinder and allowing the said fluid to escape therefrom, and means to operate the said valve.

2. A pruning apparatus comprising a cylinder having a piston operatively disposed therein, a piston rod connected to the said piston and capable of vertical operation in the said cylinder, a spring surrounding the said piston rod and bearing against the said piston to retain the same in its normal position in the lowermost portion of the said cylinder, a cylindrical member attached to the upper portion of the said cylinder capable of receiving the upper end of the said piston rod when the latter is operated, a stationary blade integral with the upper end of the said cylindrical member, a movable blade cooperating with the said stationary blade and having a substantially U-shaped shank, a link pivotally connected to one end of the said shank and to the upper end of the said piston rod and operating in a longitudinal slot in the said cylindrical member, a valve assembly attached to the lowermost end of the said cylinder and capable of admitting fluid thereinto and normally allowing the egress thereof, and means to actuate the said valve.

3. A pruning apparatus capable of pneumatic operation, comprising a cylindrical body having a piston operatively disposed therein, a piston rod attached to the said piston, a spring surrounding the said piston rod and normally retaining the said piston in the lowermost portion of the said cylindrical body, a tubular housing arranged upon the uppermost end of the said cylindrical body and having a stationary blade integral therewith, an operative blade cooperatively pivoted to the said stationary blade and having a substantially U-shaped portion, a link pivotally attached to the uppermost end of the said piston rod and to the terminal of the said U-shaped portion of the said operative blade and operating through a longitudinal slot in the said tubular housing, and means to inject fluid pressure beneath the said piston to urge the latter upwardly to operate the said operative blade in cooperation with the said stationary blade.

4. A pruning device comprising a cylinder having a piston operatively mounted therein, a piston rod having one end connected with said piston and having its opposite end projecting outwardly therefrom, a spring urging the piston toward one end of the cylinder, a tubular housing of appreciable smaller diameter than the cylinder and having one end rigidly attached to the opposite end of the cylinder, said housing having a blade rigidly attached to its opposite end, a movable blade cooperating with the first-mentioned blade and having an operative lever portion, a link connecting the lever portion of the movable blade with the outer end portion of the piston rod, said tubular housing having a lateral slot through which said link operates, and means for controlling the admission of fluid to the opposite end of the cylinder to act on said piston.

5. A pruning device comprising a cylinder having a piston operatively mounted therein, a piston rod having one end connected with said piston and having its opposite end extending outwardly therefrom, a spring urging the piston toward one end of the cylinder, a support having one end rigidly attached to the opposite end of the cylinder and extending outwardly therefrom, and said support having a blade rigidly attached to its opposite end, a movable blade cooperating with the first-mentioned blade and having an operative lever portion, a link connecting the lever portion of the movable blade with the outer end portion of the piston rod, and means for controlling the admission of fluid to the opposite end portion of the cylinder to act on said piston.

6. A pruning device comprising a cylinder having a piston operatively mounted therein, a support attached to an end of said cylinder and having a stationary blade rigidly attached thereto, a pivoted blade cooperating with said stationary blade, connecting means between the piston and pivoted blade, and means for controlling the admission of fluid to the opposite end of the cylinder to act on said piston.

7. A pruning device comprising a cylinder and a tubular support connected end to end, a piston operatively mounted in the cylinder, a stationary blade fixed to said tubular support, a movable blade pivoted thereto, said tubular support having a slot in a side thereof, connecting means extending from the piston to the movable blade through said slot for actuating said movable blade, and means for controlling the admission of fluid to the opposite end of the cylinder to act on said piston.

8. A pruning device comprising a cylinder and a tubular support rigidly connected together end to end, a piston operatively mounted in the cylinder, a stationary hook-shaped blade fixed to the outer end of the tubular support, a movable blade pivoted thereto, said tubular support having a longitudinally extending slot in a side thereof, connecting means extending from the piston to the movable blade through said slot for actuating said movable blade and means for controlling the fluid admission to and discharge from the opposite end of the cylinder.

JOHN S. GOODMAN.